United States Patent
Luna

Patent Number: 5,707,081
Date of Patent: *Jan. 13, 1998

[54] ALPHANUMERIC QUICK SYMBOL GUIDE

[76] Inventor: Roberto F. Luna, 311 Ave. Cabrillo, San Clemente, Calif. 92672

[*] Notice: The term of this patent shall not extend beyond the expiration date of Pat. No. 5,516,152.

[21] Appl. No.: 645,232

[22] Filed: May 13, 1996

Related U.S. Application Data

[63] Continuation-in-part of Ser. No. 296,960, Aug. 26, 1994, Pat. No. 5,516,152.

[51] Int. Cl.⁶ ................................................. G09B 11/00
[52] U.S. Cl. ............................ 283/45; 283/46; 283/117
[58] Field of Search ........................... 283/44, 45, 46, 283/66.1, 115, 117

[56] References Cited

U.S. PATENT DOCUMENTS

| | | | |
|---|---|---|---|
| 155,726 | 10/1874 | Howson | 283/45 |
| 229,404 | 6/1880 | Hamilton | 283/45 |
| 1,021,189 | 3/1912 | Hill . | |
| 1,145,512 | 7/1915 | Reed | 283/45 |
| 1,279,241 | 9/1918 | Brouse . | |
| 2,137,360 | 11/1938 | Skelsey . | |
| 2,922,993 | 1/1960 | Sack, Jr. . | |
| 4,024,532 | 5/1977 | Sherwin . | |
| 4,509,279 | 4/1985 | Greenberger . | |
| 4,672,759 | 6/1987 | Docherty et al. . | |
| 4,838,792 | 6/1989 | Hoyeck . | |
| 5,516,152 | 5/1996 | Luna | 283/45 |

*Primary Examiner*—Willmon Fridie, Jr.
*Attorney, Agent, or Firm*—Frank J. Uxa

[57] ABSTRACT

A symbol guide comprising a sheet and at least one pattern located on said sheet, the at least one pattern including two spaced apart substantially horizontal lines, two spaced apart substantially parallel lines positioned so that the substantially horizontal lines are located between the substantially parallel lines or extensions thereof; two substantially diagonally extending lines which cross each other in the space defined by the substantially horizontal lines, the substantially parallel lines and extensions thereof; and two substantially semi-circular curves facing each other and located within the space defined by the substantially horizontal lines, the substantially parallel lines and extensions thereof.

20 Claims, 6 Drawing Sheets

ALPHANUMERIC QUICK SYMBOL GUIDE

RELATED APPLICATION

This application is a continuation-in-part of application Ser. No. 08/296,960, filed Aug. 26, 1994, U.S. Pat. No. 5,516,152, the disclosure of which is incorporated in its entirety by reference herein.

BACKGROUND OF THE INVENTION

1. Field of the Invention

The instant invention relates generally to display signs and more specifically it relates to an alphanumeric quick symbol guide.

2. Description of the Prior Art

Numerous display signs have been provided in prior art. For example U.S. Pat. No. 1,021,189 to Hill; U.S. Pat. No. 1,279,241 to Brouse; U.S. Pat. No. 2,137,360 to Skelsey; U.S. Pat. No. 2,922,993 to Sack; U.S. Pat. No. 4,024,532 to Sherwin; U.S. Pat. No. 4,509,279 to Greenberger; U.S. Pat. No. 4,672,759 to Docherty et al. and U.S. Pat. No. 4,838,792 to Hoyeck all are illustrative of such prior art. While these units may be suitable for the particular purpose to which they address, they would not be as suitable for the purposes of the present invention as heretofore described.

HILL, IRVING

ALPHABETICAL SYMBOLS

U.S. Pat. No. 1,021,189

A designating basic form for making symbols for numerals or letters, comprising a square divided into a plurality of points and lines projected to all aligned points.

BROUSE, JOHN M

LETTERING GUIDE

U.S. Pat. No. 1,279,241

A character forming guide comprising a sheet, a circle described thereon and parallel lines applied to the sheet. One of the lines is tangent with the top of the circle, another tangent with the base of the circle and the other describing the diameter of the circle. A vertical line passes diametrically through the circle. A side line passing across the circle is parallel with the vertical diametrical line and is spaced at equal distances therefrom. Limb lines passing across the circle are parallel with the vertical diametrical line and are spaced at equal distances therefrom.

SKELSEY, ALFRED CHARLES

ILLUMINATED ADVERTISING SIGN

U.S. Pat. No. 2,137,360

An advertising sign includes a plurality of lamps arranged within compartments in a light controlling chamber. A frame has character defining strips forming character sections and is arranged in front of the compartments. A plurality of lamps are positioned in the compartments immediately behind certain strips of the character defining frame, so as to be common, each to two or more character forming sections of the frame. Other lamps are individual to specific sections of the frame.

SACK JR., EDGAR A.

DISPLAY DEVICE

U.S. Pat. No. 2,922,993

A digital display device for forming in a pre-selected manner any numerical digit, comprising a first electrode means. A composite second electrode means is spaced proximate to, but apart from, the first electrode means. At least one of the electrode means is light transmitting. Seven substantially-straight electrically-conductive principal members electrically insulated from one another comprises the second electrode means. A material comprises electroluminescent phosphor means between the first electrode means and the principal members. A substantially straight-sided composite figure eight is formed by the principal members. The figure eight comprises two substantially parallel and spaced riser portions substantially bridged at locations proximate their ends and midpoints by substantially parallel and spaced transverse portions. Each of the riser portions of the figure eight comprises two of the principal members which are spaced slightly apart and disposed in substantially straight-line configuration. The transverse portions of the figure eight are formed by the remaining three of the principal members. The first electrode means and pre-selected combinations of the principal members are adapted to have an electrical potential applied thereacross to create electric fields therebetween. Electroluminescent phosphor portions within the influence of the resulting electric fields cause the corresponding pre-selected portions of the composite figure eight to be illuminated.

SHERWIN, RICHARD N.

CHARACTER MODULE FOR AUTOMATIC SIGN

U.S. Pat. No. 4,024,532

A reflective type module for remotely controlled sign displays provides a plurality of linear elements adapted for forming the Latin alphabet and Arabic numerals. Each element is controlled by a two position electro-mechanical motor to be rotatably moved to a visual or non-visual state in response to an electrical signal. Each module is self-contained and individually encased.

GREENBERGER, WILLIAM

INTERCHANGEABLE DIGITAL DISPLAY SIGN

U.S. Pat. No. 4,509,279

This invention relates to a display device that may be constructed from a single sheet of resilient material having a plurality of color contrasting portions that may be displayed in various combinations to form a desired character, e.g. numeral, or the like.

DOCHERTY, BRIAN

LAMBLEY, STEPHEN

ALPHABETIC DISPLAY

U.S. Pat. No. 4,672,759

Digits of multi digit alphanumeric display have eight segments, via a conventional seven segment arrangement plus an eighth. The attitude/position of the eighth segment differs from digit to digit. The pattern of variation being selected, so that a limited repertoire of words and phrases can be displayed without the provision of full alphanumeric capability on all digits.

HOYECK, RALPH H.

ONE LETTER ALPHABET (OLA)

U.S. Pat. No. 4,838,792

The present invention deals with guided writing and variable displays, for sign, illustrations, etc., using (a) Guiding points at the main intersections of the lines of a common symbol representing a group of symbols, letters or figures, etc., and display means in between. (b) Holding means at the guiding points and tie lines in between. (c) Grooves, raised tracks, magnetic tracks, stretched strings, etc., in between the guiding points and fillers, coverings, markings, etc., along the lines of the symbols to be displayed. (d) Colorless markings or grooves as in (c) and pen markings over the selected symbols. (e) Bars, inking elements, etc., in between the guiding points, connected to various command centers to print or display the required symbols. (f) Series of lights on electric wires in between the guiding points, activated by various command centers. (g) Light sources located at the guiding points described in (a) and projecting in between, along the lines of the characters to be displayed.

SUMMARY OF THE INVENTION

A primary object of the present invention is to provide an alphanumeric quick symbol guide that will overcome the shortcomings of the prior art devices.

Another object is to provide an alphanumeric quick symbol guide that consists of a sheet with a geometric graphic pattern thereon, to allow a person to make any letter of the alphabet, any number and any sign symbol by tracing a specific shaped outline thereupon.

An additional object is to provide an alphanumeric quick symbol guide, in which the geometric graphic pattern has various lines and curves superimposed thereon, to help the person to trace the specific shaped outline thereupon, for example, the shaped outline of a letter of the alphabet or a single digit number.

A further object is to provide an alphanumeric quick symbol guide that is simple and easy to use.

A still further object is to provide an alphanumeric quick symbol guide that is economical in cost to manufacture.

Yet another object is to provide an alphanumeric quick symbol guide including at least one pattern, preferably a plurality or an array of patterns, each of which has a reduced number of lines and curves.

A yet additional object is to provide an array of spaced apart, substantially identical patterns which patterns are adapted to provide a human user sufficient guidelines to produce symbols, such as letters of the alphabet and/or single digit numbers, having substantial uniformity in symbol height (or length) and symbol spacing, and preferably symbol width.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DETAILED DESCRIPTION OF THE PREFERRED EMBODIMENTS

Turning now descriptively to the drawings, in which similar reference characters denote similar elements throughout the several views, FIGS. 1 through 8 illustrate an alphanumeric quick symbol guide 10, comprising a sheet 12 and an array 14 for forming on the sheet 12 any letter of an alphabet, any number and any sign symbol for display purposes. The forming array 14 is a geometric graphic pattern 16, having lines and curves superimposed thereon, so as to make any letter of the alphabet, any number and any sign symbol by a person tracing a specific shaped outline thereupon.

Figure 1:
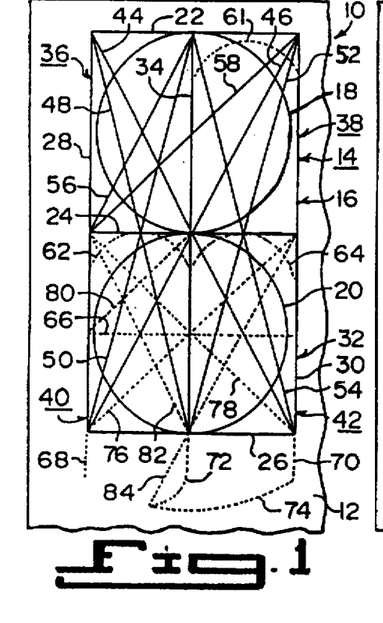
FIG. 1 is a plan view of one embodiment of the instant invention.

The geometric graphic pattern 16 includes two circles 18, 20, one above the other. Three parallel horizontal lines 22, 24, 26 are provided. The first upper horizontal line 22 is tangent with the top of the upper circle 18. The second middle horizontal line 24 is tangent with the bottom of the upper circle 18 and the top of the lower circle 20. The third lower horizontal line 26 is tangent with the bottom of the lower circle 20. Three parallel vertical lines 28, 30, 34 are also provided. The two right and left side vertical lines 28, 30 are boarded at their opposite ends with the first upper horizontal line 22 and the third lower horizontal line 26, while slightly spaced away from the sides of the two circles 18, 20, to form a rectangular configuration 32. The third central vertical line 34 intersects the two circles 18, 20 and the three horizontal lines 22, 24, 26 at their middle points, so that the rectangular configuration 32 is divided into four segments 36, 38, 40, 42.

A first set of two diagonal lines 44, 46 extend between four corners of the rectangular configuration 32. A second set of two diagonal lines 48, 50 extend between four corners of the left side of the rectangular configuration 32 constituting the first segment 36 and the third segment 40. A third set of two diagonal lines 52, 54 extend between four corners of the right side of the rectangular configuration 32 constituting the second segment 38 and the fourth segment 42.

Figure 2:
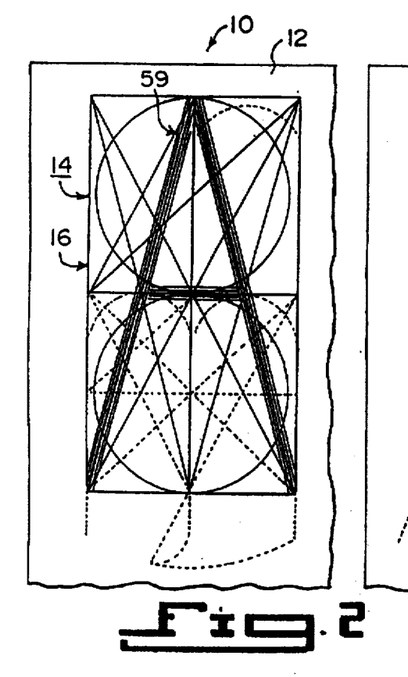
FIG. 2 is a plan view similar to FIG. 1, showing an upper case letter A made thereupon.
Figure 2A:
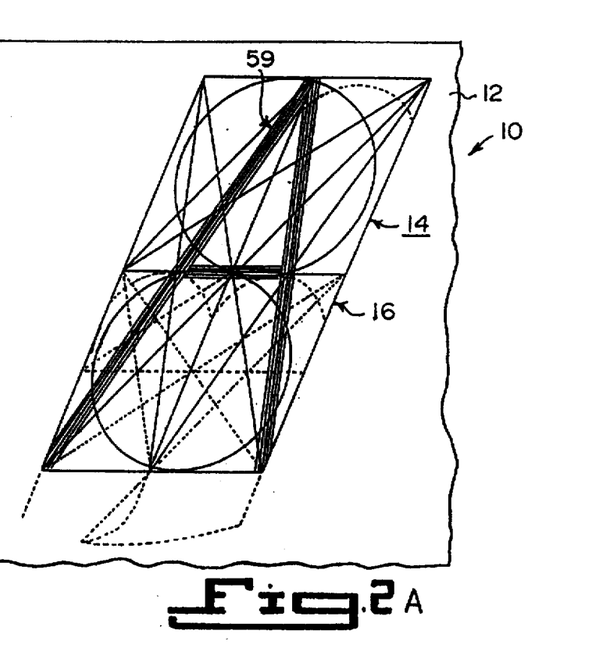
FIG. 2A is a plan view similar to FIG. 1A, showing an upper case italic letter A made thereupon.
Figure 3:
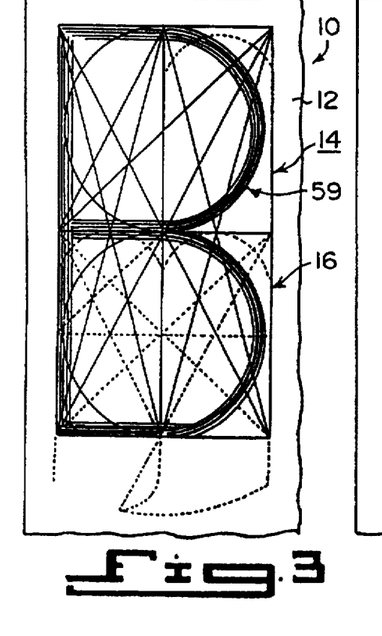
FIG. 3 is a plan view similar to FIG. 2, showing an upper case letter B made thereupon.
Figure 3A:
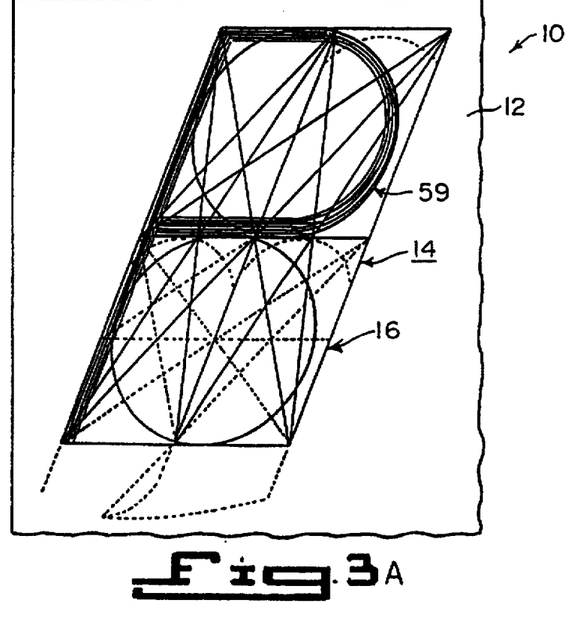
FIG. 3A is a plan view similar to FIG. 2A showing an upper case italic letter P made thereupon.
Figure 8:
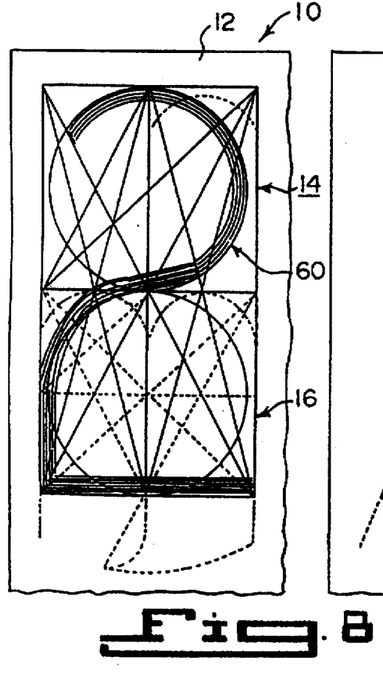
FIG. 8 is a plan view similar to FIG. 7, showing a number 2 made thereupon.
Figure 8A:
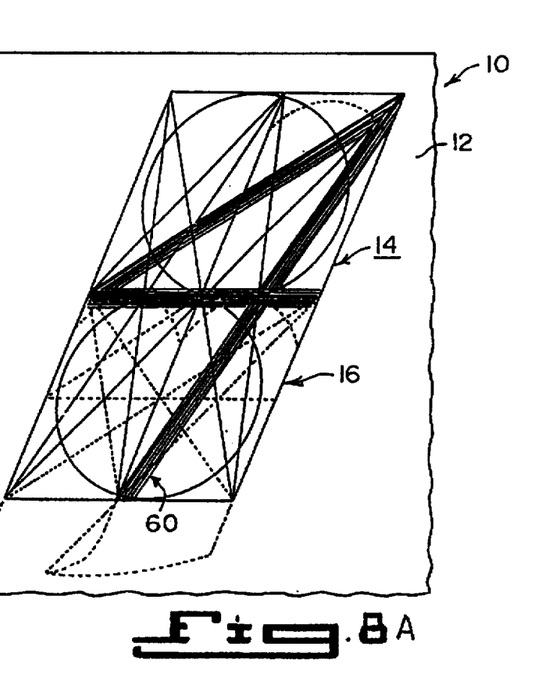
FIG. 8A is a plan view similar to FIG. 7A, showing an italic number 4 made thereupon.

A first diagonal line 56 extends between a lower left corner and an upper right corner of the first segment 36 of the rectangular configuration 32. A second diagonal line 58 extends between the lower left corner of the first segment 36 and an upper right corner of the second segment 38 of the rectangular configuration 32. Any character of any upper case letter 59, of the alphabet, as shown in FIGS. 2 and 3 and any number 60, as shown in FIG. 8, can be formed thereon by tracing its shape with a writing instrument.

The geometric graphic pattern 16 further contains a first dotted arc line 61 located within the second segment 38 of the rectangular configuration 32 and is spaced below the first upper horizontal line 22. A second dotted arc line 62 is located within the third segment 40 of the rectangular configuration 32 and is tangent with the second middle horizontal line 24. A third dotted arc line 64 is located within the fourth segment 42 of the rectangular configuration 32 and is tangent with the second middle horizontal line 24.

A horizontal dotted line 66 passes through the center of the lower circle 20 between the right and left side vertical lines 28, 30. Two parallel short vertical dotted lines 68, 70 are provided. The first vertical dotted line 68 extends downwardly from a lower left corner of the third segment 40. The second vertical dotted line 70 extends downwardly from a lower right corner of the fourth segment 42 of the rectangular configuration 32. A J-shaped vertical dotted line 72 extends downwardly from the intersection of the lower right corner of the third segment 40 and the lower left corner of the fourth segment 42, of the rectangular configuration 32. A generally horizontal concave dotted line 74 extends between a distal end of the second vertical dotted line 70 and a distal end of the J-shaped vertical dotted line 72.

Figure 4:
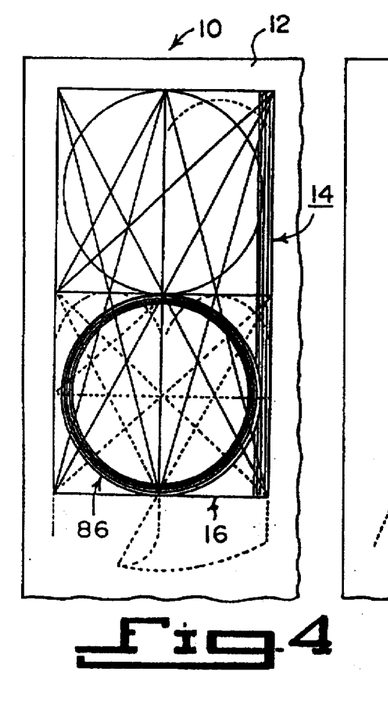
FIG. 4 is a plan view similar to FIG. 3, showing a lower case letter d made thereupon.
Figure 4A:
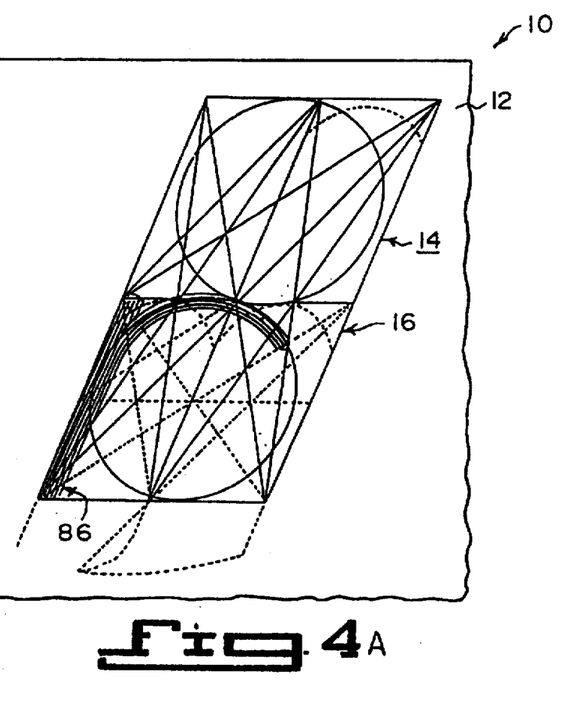
FIG. 4A is a plan view similar to FIG. 3A, showing a lower case italic letter r made thereupon.
Figure 5:
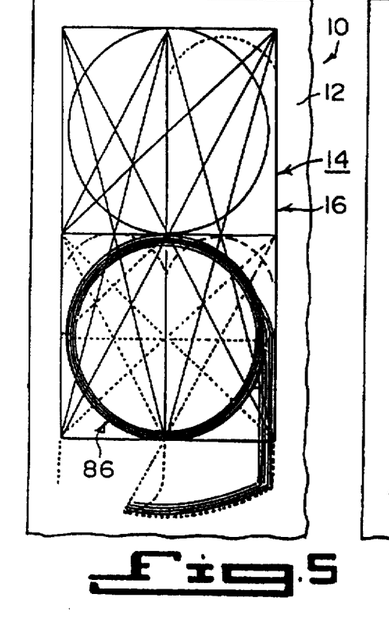
FIG. 5 is a plan view similar to FIG. 4, showing a lower case letter g made thereupon.
Figure 5A:
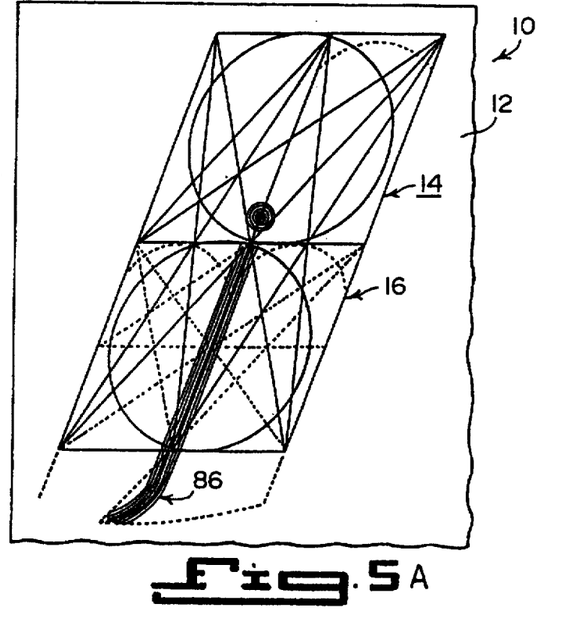
FIG. 5A is a plan view similar to FIG. 4A, showing a lower case italic letter j made thereupon.
Figure 6:
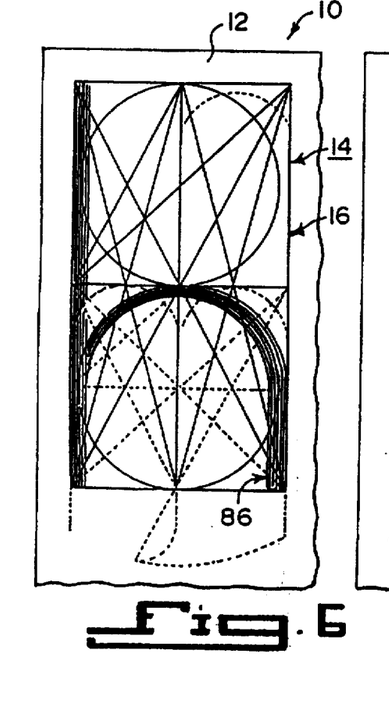
FIG. 6 is a plan view similar to FIG. 5, showing a lower case letter h made thereupon.
Figure 6A:
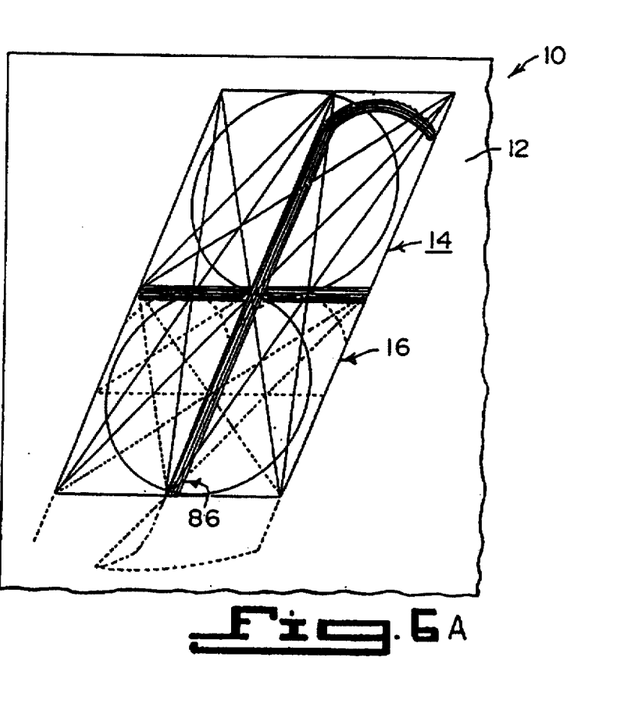
FIG. 6A is a plan view similar to FIG. 5A, showing a lower case italic letter f made thereupon.
Figure 7:
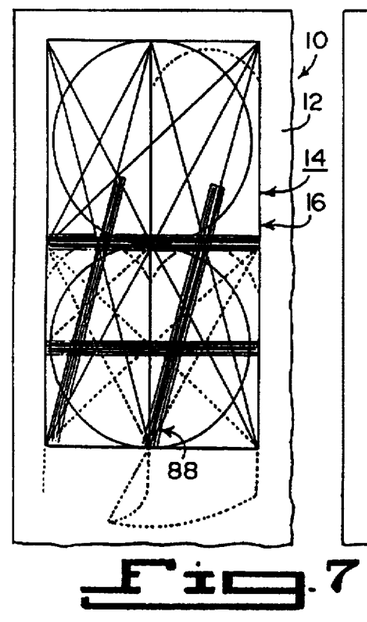
FIG. 7 is a plan view similar to FIG. 6, showing a number sign symbol made thereupon.
Figure 7A:
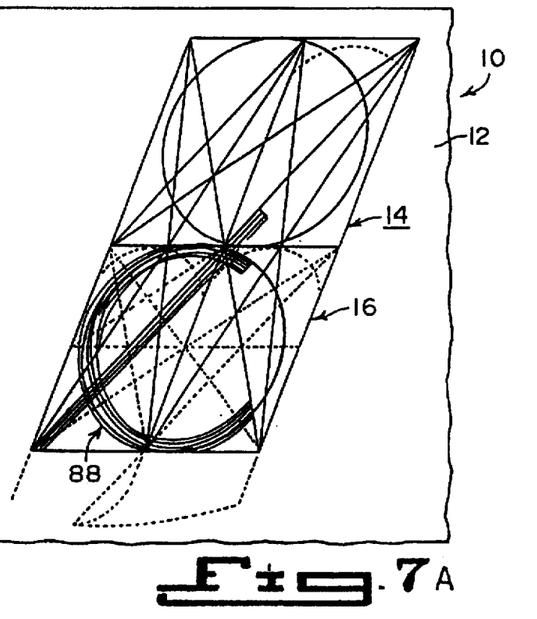
FIG. 7A is a plan view similar to FIG. 6A, showing an italic cents sign symbol made thereupon.

A set of two diagonal dotted lines 76, 78 extend between the four corners of a bottom portion of the rectangular configuration 32 constituting the third segment 40 and the fourth segment 42. A first diagonal dotted line 80 extends between the intersection of the horizontal dotted line 66 with the left side vertical line 28 and the upper right corner of the third segment 40 of the rectangular configuration 32. A second diagonal dotted line 82 extends between the lower right corner to an upper left corner of the third segment 40 of the rectangular configuration 32. A third diagonal dotted line 84 extends between the distal end of the J-shaped vertical dotted line 72 through the intersection of the lower right corner of the third segment 40 and the lower left corner of the fourth segment 42 to the upper right corner of the fourth segment 42 of the rectangular configuration 32. Any character of any lower case letter 86 of the alphabet, as shown in FIGS. 4, 5 and 6, and any sign symbol 88, as shown in FIG. 7, can be formed thereon, by tracing its shape with a writing instrument.

As shown in FIGS. 1A through 8A, all of the vertical lines of the geometric graphic pattern 16 are tilted at an angle to the right. Any upper case letter 59, any lower case letter 86 of the alphabet, any number 60 and any sign symbol 88 made by the person tracing the specific shaped outline thereupon will be of an italic type.

The sheet 12 can be a piece of paper, a poster board, or of an exterior sign material, such as typically sintra PVC. The sheet 12 can also be a thin piece of polystyrene material, a thin piece of plastic material or a bumper sticker. The sheet can be any interior or exterior sign material surface used for display purposes.

The lines and curves of the geometric graphic pattern 16 may be thin and/or light as in graph paper. This would make the lines and curves undetectable at a distance which is preferred, but detectable for tracing and/or guidance. In case the sheet 12 has a non-white background, the lines and curves could be of an opposite and/or distinguishing color.

Figure 1A:
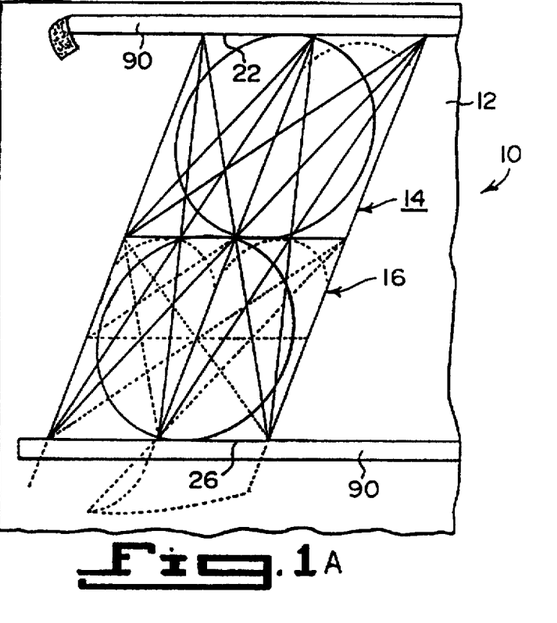
FIG. 1A is a plan view of a modification for making italic letters of the alphabet, numbers and sign symbols.

As shown in FIG. 1A, adhesive strips 90 can be placed along the first upper horizontal line 22 and the third lower horizontal line 26. A series of the geometric graphic pattern 16 are normally arranged side by side in a row. After a message is traced upon the sheet 12, the adhesive strips 90 are removed from the sheet 12, with the results being neat, straight edges along the first upper horizontal line 22 and the third lower horizontal line 26. The adhesive strips 90 can be made as a roll of tape, which could be placed onto the sheet 12 at production, or made available for a person to place on the sheet 12.

Figure 9:
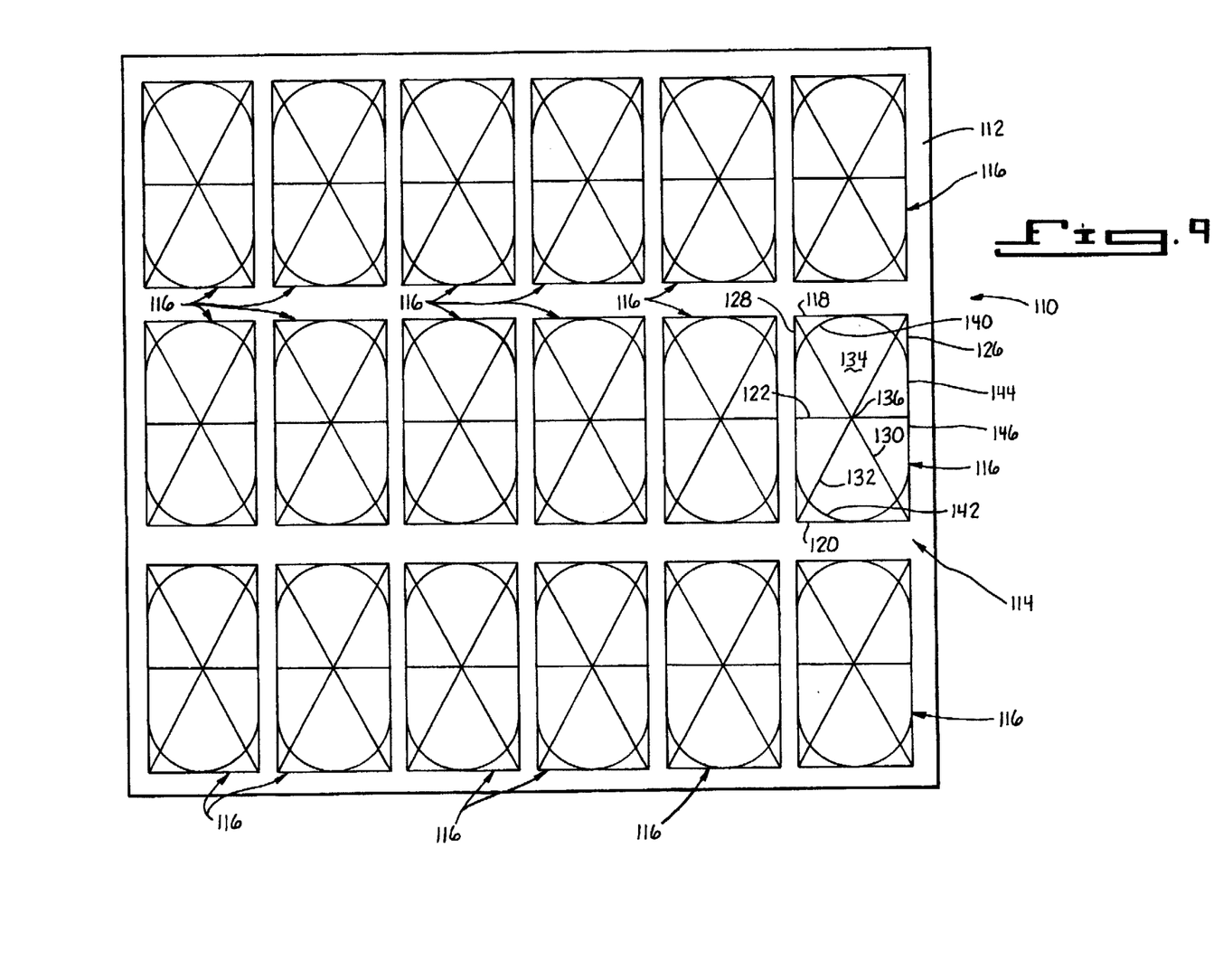
FIG. 9 is a plan view of another embodiment of the instant invention.

With reference now to FIG. 9, another embodiment of the present symbol guide is shown generally at 110. Symbol guide 110 includes a blank sheet 112, and an array 114 of identical spaced apart patterns 116. As seen in FIG. 9, the patterns 116 are present in a vertical array of at least 3 (3 shown) and a horizontal array of at least 3 (6 shown). Of course, the array of patterns 116 can be of any size, that is any number of patterns 116, needed to display the desired message.

As seen in FIG. 9, each of the patterns 116 is located directly above and/or below another pattern and directly side-by-side with another pattern. However, it is within the scope of the present invention to have the patterns 116 staggered vertically and/or horizontally, for example, as needed to provide the desired message. The patterns 116 in a horizontal row are uniformly spaced apart, and the patterns in a vertical column are uniformly spaced apart.

Each of the patterns 116 is identical, and includes fewer lines and curves than does geometric graphic pattern 16, described above in FIGS. 1-8A. It has been found that patterns 116 on sheet 112, for example, a sign board, allow a human user or person to inscribe alphanumerical messages by using the patterns to produce letters and/or numbers which are uniform in height (length) and width and which are uniformly spaced apart. Thus, the resulting message is easy to read and is aesthetically pleasing and appealing. In addition, with the reduced number of lines and curves present in each pattern 116, the human user or inscriber can produce symbols and messages consistent with his/her own printing style while providing basic uniformity of symbol height, width and spacing. In short, the present invention allows the production of inscribed, for example, traced, printed and the like, messages which are neat, horizontally straight, comprised of alphanumeric symbols which are uniform in height and width and spacing and have uniform spacing between message rows. All this is achieved in a time-saving manner without the need for tedious pre-ruling (with a pencil or pen and ruler), without the need for separate tangible templates and without the need for stencils or stick on alphanumeric symbols.

Each of the patterns 116 include two spaced apart substantially horizontal lines. These are upper horizontal line 118 and lower horizontal line 120. An optional middle horizontal line 122 may be included and is located equidistant from upper and lower horizontal lines 118 and 120, respectively. Two substantially parallel lines are included. Thus, right parallel line 126 and left parallel line 128 are included and are positioned so that the horizontal lines 118, 120 and 122 are located between the parallel lines or extensions thereof. Two substantially diagonally extending lines 130 and 132 are provided and cross each other in the space 134 defined by the horizontal lines 118 and 120 and the parallel lines 126 and 128 and extensions thereof. Although each of the lines in pattern 116 illustrated in FIG. 9 meet one or more other lines, a pattern in which one or more lines and/or curves fail to meet is within the scope of the present invention, provided that such pattern functions substantially as described herein. Preferably, the two diagonally extending lines 130 and 132 cross at the center point 136 of pattern 116.

Two substantially semi-circular (arc of about 180°) curves 140 and 142 are provided and face each other. These curves 140 and 142 are located within the space 134. One purpose of the lines and curves of pattern 116 is to provide perimeter and central guidance for the human user, e.g., inscriber, in producing alphanumeric symbols. The curves 140 and 142 provide guidance for inscribing letters and numbers that have one or more curved aspects. Uniform symbol height and width are obtained, while promoting neatness and clarity and aesthetic appeal of the resulting message.

Preferably, the pattern 116 has a length defined by the distance between the upper and lower horizontal lines 118 and 120, respectively. In a particularly useful embodiment, the two curves 140 and 142 are located near opposing ends of the length, for example, as shown in FIG. 9 near upper horizontal line 118 and lower horizontal line 120, respectively.

Although the patterns 116 illustrated in FIG. 9 includes parallel lines 126 and 128 which are vertical, such parallel lines can be oriented at an acute angle relative to vertical. This "off-vertical" orientation gives the resulting printing the appearance of being italicized.

The lines and curves of pattern 116 can be solid (as illustrated in FIG. 9), or dotted or any other suitable modification or combination of the same. Different lines and curves can be presented differently as desired.

With particular reference to FIG. 9 (although the same applies with regard to FIGS. 1 to 8 and 10), the patterns 116 can be viewed as each including a first rectangle 144 and a second rectangle 146 having a common interface, along middle horizontal line 122. The first rectangle 144 includes a first group of lines and at least one first curve and the second rectangle 146 includes a second group of lines and at least one second curve. The second group of lines and the at least one second curve are mirror images of the first group of lines and the at least one first curve, respectively.

Figure 10:
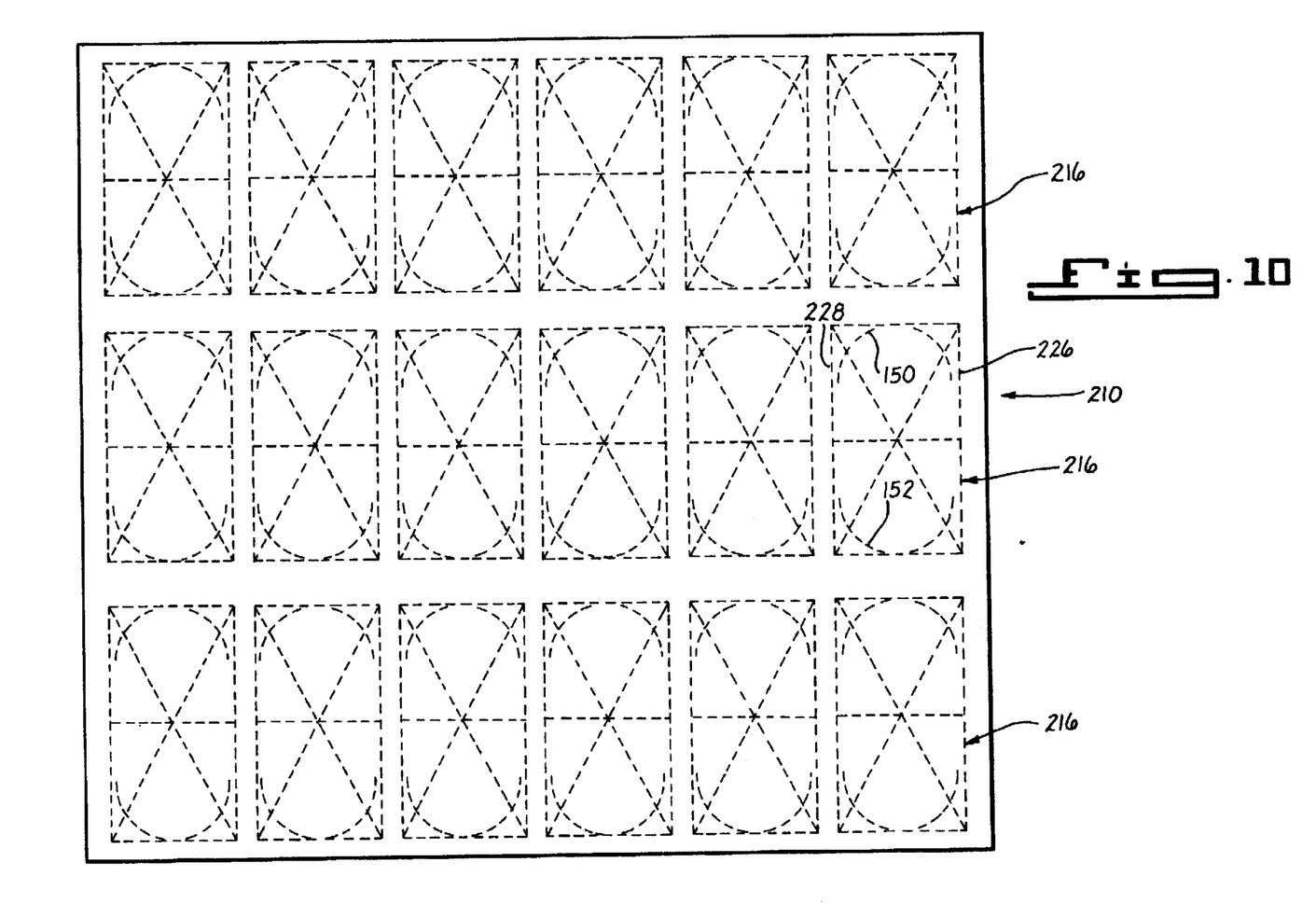
FIG. 10 is a plan view of a modification of the embodiment shown in FIG. 9.

FIG. 10 illustrates a modified symbol guide shown generally at 210. Except as expressly stated herein, modified guide 210 is identical to guide 110. Each component of modified guide 210 which corresponds to a component of guide 110 is given the same reference numeral increased by 100.

One primary difference between modified symbol guide 210 and symbol guide 110 is that the lines and curves of the modified symbol guide 210 are dotted and somewhat more light or faint relative to the lines and curves of the symbol guide 110. This feature allows the traced or printed message to be more prominently displayed, with reduced distraction caused by the exposed lines and curves of the individual patterns 216. At the same time, the patterns 216 have been found to provide effective guidance in producing messages, as desired.

Another difference between modified symbol guide 210 and symbol guide 110 is that the facing semi-circular curves 150 and 152 of patterns 216 do not intersect substantially parallel lines 226 and 228. The fact that curves 150 and 152 do not intersect parallel lines 226 and 228 has been found to have substantially no deleterious effect on the usefulness of the modified symbol guide 210, for example, the ability of the modified symbol guide to facilitate the production of messages, as desired. It should be noted that one or more of the lines of patterns 116 and 216 need not intersect as shown in FIGS. 9 and 10 in order to symbol guide 110 and modified symbol guide 210 to have substantial utility in facilitating the production of messages. Such intersecting lines (and curves) are preferred. However, symbol guides in which the patterns include one or more lines which do not intersect (in contrast to the patterns shown in FIGURES) are within the scope of the present invention.

LIST OF REFERENCE NUMBERS 10 alphanumeric quick symbol guide
12 sheet
14 forming array
16 geometric graphic pattern for 14
18 upper circle
20 lower circle
22 first upper horizontal line
24 second middle horizontal line
26 third lower horizontal line
28 first left side vertical line
30 second right side vertical line
32 rectangular configuration
34 third central vertical line
36 first segment of 32
38 second segment of 32
40 third segment of 32
42 fourth segment of 32
44 diagonal line
46 diagonal line
48 diagonal line
50 diagonal line
52 diagonal line
54 diagonal line
56 diagonal line
58 diagonal line
59 upper case letter
60 number
61 first dotted arch line
62 second dotted arc line
64 third dotted arc line
66 horizontal dotted line
68 first short vertical dotted line
70 second short vertical dotted line
72 J-shaped vertical dotted line
74 generally horizontal concave dotted line
76 diagonal dotted line
78 diagonal dotted line
80 diagonal dotted line
82 diagonal dotted line
84 diagonal dotted line
86 lower case letter
88 sign symbol
90 adhesive strip
110 symbol guide
112 blank sheet
114 array
116 pattern
118 upper horizontal line
120 lower horizontal line
122 middle horizontal line
126 right parallel line 128 left parallel line
130 diagonally extending line
132 diagonally extending line
134 space
136 center point
140 substantially semi-circular curve
142 substantially semi-circular curve
144 first rectangle
146 second rectangel
150 facing semi-circular curve
152 facing semi-circular curve
210 modified symbol guide
216 pattern
226 parallel line
228 parallel line It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omission, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A symbol guide comprising:
    a sheet; and
    at least one pattern located on said sheet, said at least one pattern including two spaced apart substantially horizontal lines, two spaced apart substantially parallel lines positioned so that said substantially horizontal lines are located between said substantially parallel lines or extensions thereof; two substantially diagonally extending lines which cross each other in the space defined by the substantially horizontal lines, the substantially parallel lines and extensions thereof; and two substantially semi-circular curves facing each other and located within the space defined by the substantially horizontal lines, the substantially parallel lines and extensions thereof.

2. The symbol guide of claim 1 wherein said at least one pattern has a length defined by the distance between said two spaced apart substantially horizontal lines, and said two substantially semi-circular curves are located near opposing ends of the length.

3. The symbol guide of claim 1 wherein said substantially parallel lines are substantially vertical.

4. The symbol guide of claim 1 which further comprises a third substantially horizontal line substantially equidistantly spaced apart from each of said two substantially horizontal lines.

5. The symbol guide of claim 1 wherein at least one of said lines and said curves is solid.

6. The symbol guide of claim 1 wherein a plurality of said patterns are located on said sheet with each said pattern being spaced apart from the other pattern or patterns.

7. The symbol guide of claim 1 which includes a substantially horizontal array of at least three of said patterns.

8. The symbol guide of claim 1 which includes a substantially vertical array of at least three of said patterns.

9. The symbol guide of claim 1 wherein said sheet is a piece of paper.

10. The symbol guide of claim 1 wherein said sheet is a poster board.

11. The symbol guide of claim 1 wherein said sheet is a sign board.

12. The symbol guide of claim 1 wherein said sheet is a thin piece of polystyrene material.

13. The symbol guide of claim 1 wherein said sheet is a thin piece of plastic material.

14. The symbol guide of claim 1 wherein said sheet is a bumper sticker.

15. The symbol guide of claim 1 wherein said sheet is any interior/exterior sign board used for display purposes.

16. A sheet comprising a plurality of spaced apart patterns each comprising first and second rectangles having a common interface, said first rectangle including a first group of lines and at least one first curve and said second rectangle including a second group of lines and at least one second curve, said second group being the mirror image of said first group and said at least one second curve being the mirror image of said at least one first curve.

17. A symbol guide comprising:
    a sheet; and
    a plurality of spaced apart substantially identical patterns located on said sheet each comprising a plurality of lines and curves adapted to provide a human user sufficient guidance to produce symbols selected from the group consisting of letters of the alphabet and single digit numbers having substantial uniformity in symbol height and symbol spacing.

18. The symbol guide of claim 17 which includes a substantially horizontal array of at least three of said substantially identical patterns.

19. The symbol guide of claim 18 which includes a substantially vertical array of at least three of said substantially identical patterns.

20. The symbol guide of claim 17 wherein the spaces on said sheet between said substantially identical patterns are substantially blank.

* * * * *